United States Patent [19]
Hedberg et al.

[11] 3,944,614
[45] Mar. 16, 1976

[54] 2,2'-BIS(PHENYLETHYNYL-5,5'-DIAMINOBENZIDINE

[75] Inventors: Frederick L. Hedberg, Dayton; Fred E. Arnold, Centerville, both of Ohio

[73] Assignee: The United States of America as represented by the Secretary of the Air Force, Washington, D.C.

[22] Filed: Nov. 22, 1974

[21] Appl. No.: 526,192

Related U.S. Application Data

[62] Division of Ser. No. 461,689, April 17, 1974, Pat. No. 3,876,614.

[52] U.S. Cl. .............................. 260/578; 260/250 R
[51] Int. Cl.² ................. C07C 87/54; C07D 241/42
[58] Field of Search ............ 260/575, 578, 580, 581

[56] References Cited
UNITED STATES PATENTS
3,852,364  12/1974  Diamond ........................ 260/578 X OTHER PUBLICATIONS
Mueller et al. "Bisacetylene Compounds". Jn. Chem. Ab. 18892b, Vol. 69, 1968 p. 1771.
Zhurnol Obshchei Khimii Vol. 29 (1959) pp. 3770–3772.

*Primary Examiner*—Allen B. Curtis
*Attorney, Agent, or Firm*—Joseph E. Rusz; Cedric H. Kuhn

[57] ABSTRACT

Quinoxaline polymers are synthesized by solution polycondensation of 2,2'-bis(phenylethynyl)-5,5'-diaminobenzidine with aromatic bis-benzils. Upon heating the polymers so prepared at a temperature ranging from about 240° to 300°C, they undergo a thermal intramolecular cyclization reaction, thereby providing cured, thermally stable, highly fused quinoxaline composition. Because of their solubility in aprotic solvents and the mechanism whereby they are cured, the quinoxaline polymers are particularly suitable for use in high temperature applications such as in the fabrication of plastic composites and protective coatings.

1 Claim, No Drawings

2,2'-BIS(PHENYLETHYNYL-5,5'-DIAMINOBENZIDINE

RIGHTS OF THE GOVERNMENT

The invention described herein may be manufactured and used by or for the Government of the United States for all governmental purposes without the payment of any royalty.

This application is a division of copending U.S. application Ser. No. 461,689, filed on Apr. 17, 1974 now U.S. Pat. No. 3,876,614.

FIELD OF THE INVENTION

This invention relates to quinoxaline polymers which after curing exhibit a high degree of thermal stability. In one aspect it relates to a method for synthesizing the quinoxaline polymers. In another aspect it relates to cured quinoxaline polymers which do not have a softening point below their decomposition temperature.

BACKGROUND OF THE INVENTION

During the past several years, polymeric materials have been developed that possess heat resistance and strength properties found previously only in metals. In addition, the polymers are much lighter than metals, an important advantage where weight is a factor as in modern, high speed aerospace applications. By utilizing structure-property relationships, such as aromatic rings for thermal stability and aromatic-heterocyclic rings for adhesive and cohesive characteristics, it is possible to tailor polymer structures to provide desired end-use properties, such as strength, adhesiveness, elasticity, solvent-resistance, etc. While it may thus be possible to provide a suitable polymer system for a given application, the problem of processing the polymer into an end-use item must also be considered. The processing problem has probably been the most restrictive factor in limiting the use of high temperature resistant polymers.

To process a polymer into a composite structure, it is necessary to cause the polymer to flow in order to impregnate the reinforcing substrate and mold to the desired form. The lower the softening point (Tg) or the melting point (Tm) of a polymer, the easier it is to cause the polymer to flow. In general, a softening point of about 200°C or below is most desirable. While a composite fabricated with a polymer having a softening point of 200°C is suitable for use at 30°C, it will soften and lose its strength at temperatures approaching 200°C. To render the composite suitable for use at temperatures greater than 200°C, a method is required for subsequently raising the softening point of the polymer higher than the desired maximum use temperature. The conventional method of raising polymer softening points is to cure the polymer by joining new chemical bonds or crosslinks between polymer chains. In the curing method most widely employed, a trifunctional monomer is used in the polymer synthesis to provide crosslinking sites along the polymer backbone. This method often leads to branching and gelation during synthesis or storage of prepreg solutions. Other methods for accomplishing crosslinking include radiation, addition of a free radical source, incorporation of a pendant group which can react thermally or chemically, and thermal scission of C—H bonds in the polymer backbone.

There are three major disadvantages to the crosslinking method of cure. One disadvantage results from the evolution of volatiles from any type of cure in which a condensation reaction is used. Because of the volatiles evolution, voids are formed by entrapped gases, effectively weakening the composite structure. A second disadvantage derives from the brittleness which is inherent in a three dimensional network. The third disadvantage lies in the fact that the softening point is raised only as high as the cure temperature because of "freezing in" of the reactive sites when the polymer softening point reaches the cure temperature. In other words, the polymer begins to soften as the use temperature approaches the cure temperature.

It is an object of this invention, therefore, to provide quinoxaline polymers which can be converted to thermally stable, highly fused quinoxaline compositions by non-volatile, intramolecular cyclization.

Another object of the invention is to provide a method for synthesizing quinoxaline polymers.

A further object of the invention is to provide a method of curing quinoxaline polymers that is not subject to disadvantages of crosslinking procedures.

Still another object of the invention is to provide quinoxaline polymers which are soluble in aprotic solvents.

A still further object of the invention is to provide a new monomer for use in the synthesis of quinoxaline polymers.

Other objects and advantages of the invention will become apparent to those skilled in the art upon consideration of the accompanying disclosure.

SUMMARY OF THE INVENTION

The present invention resides in quinoxaline polymers which consist essentially of repeating units having the following formula:

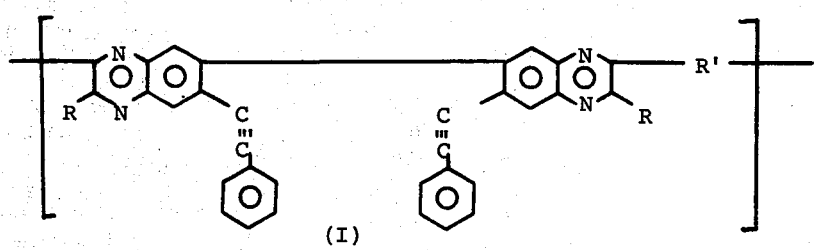

(I)

where R is

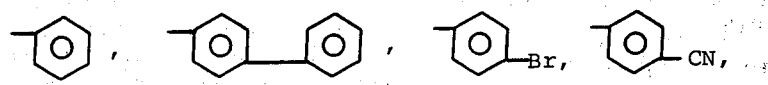

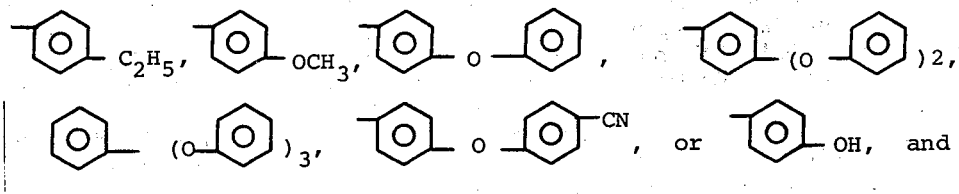

 or OH, and wherein R' is

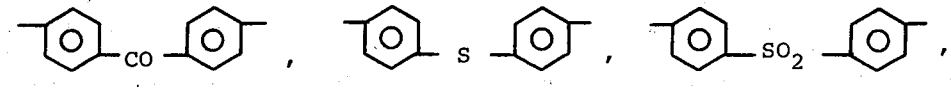

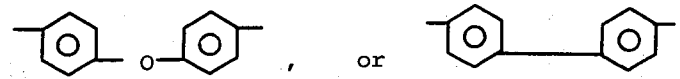

There are generally at least two, preferably at least four, of the recurring units of the polymers. In general, the number of recurring units is such that the polymers have an inherent viscosity of about 0.10 to 1.0 dl/g in chloroform at 30°C.

In one embodiment, the instant invention resides in a method for preparing the quinoxaline polymer by reacting 2,2'-bis(phenylethynyl)-5,5'-diaminobenzidine with an aromatic bis-benzil. The condensation reaction involved is illustrated by the following equation:

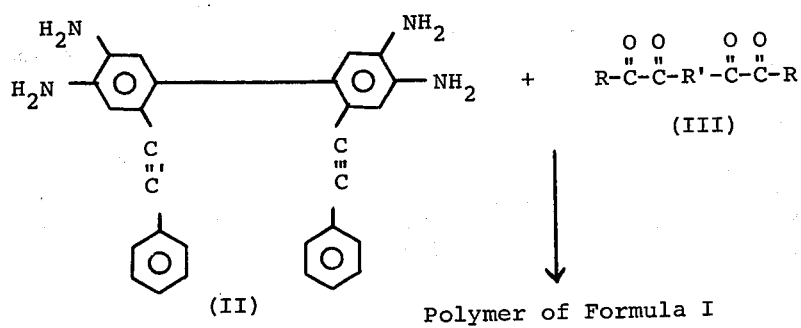

In Formula III, R and R' are as defined hereinabove.

The reaction illustrated by the foregoing equation is conducted in an inert atmosphere, employing an aprotic solvent as the reaction maximum. Example of inert gases that can be used include nitrogen, argon, helium, and the like. Examples of suitable aprotic solvents include m-cresol, dimethyl formamide, dimethyl acetamide, hexamethyl phosphoramide, tetramethyl urea, dimethyl sulfoxide, tetrachloroethylene, trichloroethylene, chloroform, and the like. It is generally preferred to utilize m-cresol as the reaction medium. The reaction is usually conducted at a temperature ranging from about room temperature to 100°C for a period of about 1 to 96 hours. It is critical that the temperature does not exceed 100°C in order to ensure that the acetylenic groups do not react prematurely. Upon completion of the reaction, the product is conveniently recovered by adding the reaction mixture to an alcohol, such as methanol, thereby precipitating the polymer from solution. After recovery of the polymer, as by filtration or decantation, it is washed with an alcohol and finally air dried or dried under reduced pressure. In order to purify the polymer further, the foregoing procedure may be repeated one or more times, i.e., dissolution of the dried polymer in a solvent, precipitation of the polymer by adding the solution to an alcohol, separation of the precipitated polymer, and drying of the separated polymer.

In the synthesis of the quinoxaline polymers, the monomers are generally employed in equimolar amounts. While a small excess of one of the monomers is not detrimental to the condensation reaction, a considerable excess of one of the reactants results in the production of lower molecular weight products.

The bis-benzil of Formula III used in the polycondensation reaction are well known compounds that are described in the literature. Examples of such compounds include p-bis(phenylglyoxylyl)benzene, m-bis(phenylglyoxylyl)benzene, m-bis(p'-ethylphenylglyoxylyl)benzene, m-bis(p'-methoxyphenylglyoxylyl)benzene, m-bis(p'-phenoxyphenylglyoxylyl)benzene, m-bis[p''-(p''-phenoxy)phenoxyphenylglyoxylyl]benzene, m-bis[p'-(p''-[p'''-phenoxy]phenoxy)phenoxyphenylglyoxylyl]benzene, m-bis[p'-(p''-cyano)-phenoxyphenylglyoxylyl]benzene, m-bis(p'-biphenylglyoxylyl)benzene, m-bis(p'-hydroxyphenylglyoxylyl)-benzene, p,p'-bis(phenylglyoxylyl)diphenylmethane, p,p'-bis(phenylglyoxylyl)benzophenone, p,p'-bis(phenylglyoxylyl)diphenyl sulfide, p,p'-bis(phenylglyoxylyl)diphenyl sulfone, p,p'-bis(phenylglyoxylyl)diphenyl ether, p,p'-bis(p''-bromophenylglyoxylyl)diphenyl ether, and p,p'-bis(p''-cyanophenylglyoxylyl)diphenyl ether.

The tetraamine monomer, which is characterized by having pendant phenylethynyl groups, is a new compound. The presence of these pendant groups on the quinoxaline polymer chain provides an internal cross-linking mechanism whereby the fusible polymer can be cured by internal cyclization to an infusible polymer. Furthermore, the pendant groups afford a mechanism whereby the softening point of the cured polymer is raised without any evolution of by-products. The preparation of the 2,2'-bis(phenylethynyl)-5,5'-diaminobenzidine involves five synthetic reactions as described hereinafter in Example I.

Curing of the quinoxaline polymers is accomplished by heating them in an inert atmosphere at a temperature ranging from about 240° to 300°C. A heating period of from about 1 to 2 hours is usually sufficient to obtain a complete cure although longer times, e.g., up to 24 hours, can be used. In the curing operation, cyclization of the pendant phenylethynyl moieties occurs, resulting in a cured polymer having a dibenzoanthracene structure according to the following formula:

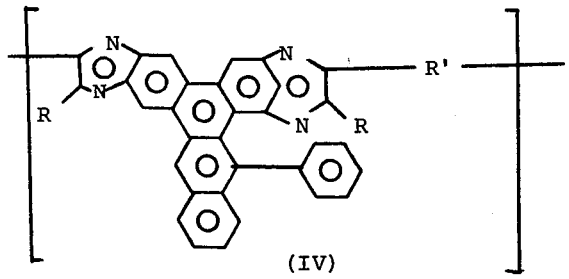

(IV)

where R, and R' are as indicated above.

A more complete understanding of the invention can be obtained by referring to the following illustrative examples which are not intended, however, to be unduly limitative of the invention.

EXAMPLE I

Preparation of 2,2'-bis(phenylethynyl)-5,5'-diaminobenzidine.

a. N,N'-Diacetyl-2,2'-diiodobenzidine

Sixteen grams (0.036 mol) of 2,2'-diiodobenzidine was added rapidly, with stirring to 160 ml. of acetic anhydride. The reaction mixture turned almost clear after which a white precipitate formed. The white suspension was stirred and refluxed for 1.5 hours after which it was permitted to cool to 23° C.

The product, N,N'-diacetyl-2,2'-diiodobenzidine, was isolated by filtration from two runs carried out as described above. Yields of 97 and 100 percent were obtained and the product showed a melting point of 300°–301°C.

Analysis — Calc'd for $C_{16}H_{14}I_2N_2O_2$ (percent): C, 36.94; H, 2.71; I, 48.80; N, 5.38. Found (percent): C, 36.67, 37.00; H, 3.06, 3.22; I, 48.88; N, 5.01.

b. N,N'-Diacetyl-2,2'-diiodo-5,5'-dinitrobenzidine

The suspension of N,N'-diacetyl-2,2'-diiodobenzidine in acetic anhydride, prepared as described above, was cooled in a cooling bath to −10°C. Twenty ml. of concentrated nitric acid was added dropwise to the suspension at a rate such that the temperature did not rise above 0°C. After the addition was completed, the bath temperature was raised to 10°C and allowed to remain at that temperature for 20 hours. Shortly after the temperature of the reaction mixture reached 10°C, an orange solution formed, and about 30 minutes later a yellow precipitate began to come out of solution. At the end of the reaction period, the precipitate was recovered by filtration, washed three times with 100 ml. of ether and dried by suction. The yellow solid (7.8 g.) was purified by warming in 300 ml. of tetrahydrofuran until dissolved and then reprecipitating with 2 lbs. of ether. After recovery by filtration, washing 2 times with 100 ml. of ether and drying in a vacuum oven at 600°C and 1 mm of Hg for 4 hours, the product, N,N'-diacetyl-2,2'-diiodo-5,5'-dinitrobenzidine weighed 6.4 g. (29% yield) and had a melting point of 296°–298°C.

Analysis — Calc'd for $C_{16}H_{12}I_2N_4O_6$ (percent): C, 31.50; H, 1.98; I, 41.60; N, 9.19; molecular weight 610. Found (percent): C, 31.64, 31.24; H, 1.94, 1.85; I, 40.34, 40.10; molecular weight 610 (by mass spectrometry).

c. 2,2'-Diiodo-5,5'-dinitrobenzidine

A 16 g amount (0.025 mol) of N,N'-diacetyl-2,2'-diiodo-5,5-dinitrobenzidine was dissolved in 120 ml. of concentrated sulfuric acid. To this solution there was added 260 ml. of water, the addition being made slowly so as to keep the product in solution. After addition was completed, the solution was heated at 100°C for 1 hour. After cooling, the solution was added to 2 liters of water, forming a bright orange precipitate. The precipitate was recovered by filtration, washed three times with 500 ml of water, and then dried by suction. The precipitate was taken up in 500 ml of water and passed through a column of alumina, eluting with tetrahydrofuran. The tetrahydrofuran was evaporated, leaving an orange solid which was dried in a vacuum oven at 600°C and 1 mm of Hg for 4 hours. About 12.1 g. (91% yield) of the product, 2,2'-diiodo-5,5'-dinitrobenzidine, having a melting point of 346°–348°C was obtained.

Analysis — Calc'd for $C_{12}H_8I_2N_4O_4$ (percent): C, 27.40; H, 1.53; I, 48.25; N, 10.28; molecular weight 526. Found (percent): C, 28.08, 28.72; H, 1.56, 1.47; I, 49.76; N, 10.28; molecular weight 526 (by mass spectrometry).

d. 2,2'-Bis(phenylethynyl)-5,5'-dinitrobenzidine

A solution of 2,2'-diiodo-5,5'-dinitrobenzidine (11.5 g, 0.021 mol) in 1200 ml. of dry pyridine was stirred at 23°C for 15 minutes while dry nitrogen was bubbled through the solution. The nitrogen flow was continued while copper phenylacetylide (12.0 g, 0.073 mol) was added and the reaction mixture was heated to reflux and refluxed for 48 hours. The pyridine was removed by distillation at 1 mm of Hg with a rotary evaporator. The residue was extracted three times with 200 ml. of tetrahydrofuran and filtered. The filtrate was passed through a column of alumina, eluting with tetrahydrofuran until thin layer chromatographic (TLC) analysis of the eluate showed only red colored spots. The desired product appeared as an orange spot on TLC analysis with an $R_f$ value higher than that of subsequent red spots. The tetrahydrofuran eluate was concentrated to dryness on a rotary evaporator and the residue was stirred and refluxed for 15 minutes with benzene. The benzene extracts were filtered hot and allowed to cool to give 1.25 g. of orange crystals of 2,2'-bis-(phenylethynyl)-5,5'-dinitrobenzidine (melting point 252°–253°C). Concentration of the mother liquor to 400 ml. gave an additional 0.86 g of material (melting point 252°–253°C). The mother liquor from this second crop was chromatographed on a column of alumina. After elution of acetylenic impurities with benzene, the orange band containing the desired product was eluted with methylene chloride. The eluate was concentrated to 100 ml and then diluted to 600 ml. with hexane. The resultant precipitate was filtered and washed with hexane to give 0.92 g of 2,2'-bis(phenylethynyl)-5,5'-dinitrobenzidine (melting point 252°–253°C) for a total yield of 3.03 g (31%).

Analysis — Calc'd for $C_{28}H_{18}N_4O_4$ (percent): C, 70.88; H, 3.82; N, 11.81; molecular weight 474. Found (percent): C, 70.63, 70.48; H, 3.66, 3.73; N, 11.80, 11.84; molecular weight 474 (by mass spectrometry).

e. 2,2'-Bis(phenylethynyl)-5,5'-diaminobenzidine

A solution of 2,2'-bis(phenylethynyl)-5,5'-dinitrobenzidine (0.474 g, 0.00100 mol) in dioxane (50 ml), freshly distilled from $FeSO_4$ (3.65 g, 0.024 mol), was added to a boiling solution of $FeSO_4$ (3.65 g, 0.024 mol) in water (50 ml.) which was stirred under nitrogen. After 5 minutes, ammonium hydroxide (20 ml, 30%) was added slowly followed by 20 ml. more of dioxane. The resultant dark suspension was stirred and refluxed for 30 minutes at which point additional ammonium hydroxide (20 ml) was added. Refluxing was continued for 30 minutes and then the reaction mixture was cooled and extracted three times with 100 ml. of chloroform. The combined chloroform extracts were concentrated to dryness on a rotary evaporator. The residue was dissolved in methylene chloride (20 ml.) and filtered after which the filtrate was poured with stirring into 20 ml. of hexane. The resultant precipitate was filtered, washed with hexane, and dried at 23°C in a vacuum oven at 1 mm of Hg for 24 hours to give 0.313 g (76% yield) of 2,2'-bis(phenylethynyl)-5,5'-diaminobenzidine which softened above 100°C to a viscous melt.

Analysis — Calc'd for $C_{28}H_{22}N_4$ (percent): C, 81.14; H, 5.34; N, 13.52; molecular weight 414. Found (percent): C, 80.79, 80.93; H, 5.06, 5.13; N, 13.25, 13.25; molecular weight 455, 456 (by vapor phase osmometry in benzene).

EXAMPLE II

Synthesis of:

Poly[2,2'-(p-phenyleneoxy-p-phenylene)-6,6'-bis(3-phenyl-7-phenylethynylquinoxaline)]

A mixture of 2,2'-bis(phenylthynyl)-5,5'-diaminobenzidine (0.313 g, 0.000755 mol) and p,p'-bis(phenylglyoxylyl)diphenyl ether (0.328 g, 0.000755 mol) was stirred under a flow of dry nitrogen for 5 minutes. Thereafter, m-cresol (50 ml.) was added. The reaction mixture was stirred at 23°C for 24 hours and at 85°–90°C for 18 hours. o-Phenylenediamine (0.50 g) was added to end-cap and stirring was continued for 24 hours at 23°C. The polymer was then precipitated by adding the reaction mixture to 500 ml. of methanol and purified by successive reprecipitations from chloroform solution with methanol, ether and ethyl acetate. After drying at 60°C and 1 mm of Hg pressure for 24 hours, the poly[2,2'-phenyleneoxy-p-phenylene-6,6'-bis(3-phenyl-7-phenylethynylquinoxaline)] showed an inherent viscosity of 0.30 dl/g in chloroform at 30°C. The polymer was soluble in methylene chloride, chloroform, tetrahydrofuran, dioxane, and m-cresol.

Analysis — Calc'd for $C_{56}H_{32}N_4O$ (percent): C, 86.57; H, 4.15; N, 7.21. Found (percent): C, 85.05, 84.98; H, 3.84, 3.89; N, 6.91

EXAMPLE III

A solution of the polymer of Example II was poured into a flat bottom pan. The pan was heated at a temperature sufficient to evaporate the solvent. A flexible film having good physical properties was thereafter recovered from the pan.

EXAMPLE IV

A sample of the polymer of Example II was subjected to differential thermal analysis ($\Delta T = 20°C/min$). According to the analysis, there was a strong exotherm at 250°C upon heating from 23° to 325°C. An infrared spectrum of the polymer showed an intense acetylene band at 2220 $cm^{-1}$ which diminished in a spectrum of a polymer sample which had been heated to 280°C under nitrogen. The acetylene band disappeared completely in a spectrum of a polymer sample which had been heated to 320°C under nitrogen. No softening point was obtained for the polymer of Example II by either thermomechanical analysis or torsion braid analysis.

In the heating operations during which the polymer was cured, there was no evolution of by-products.

EXAMPLE V

Synthesis of:

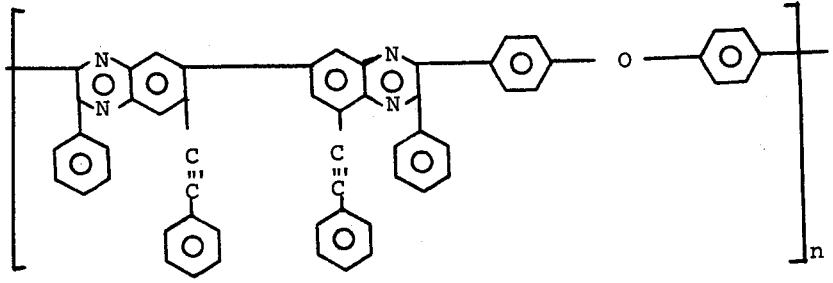

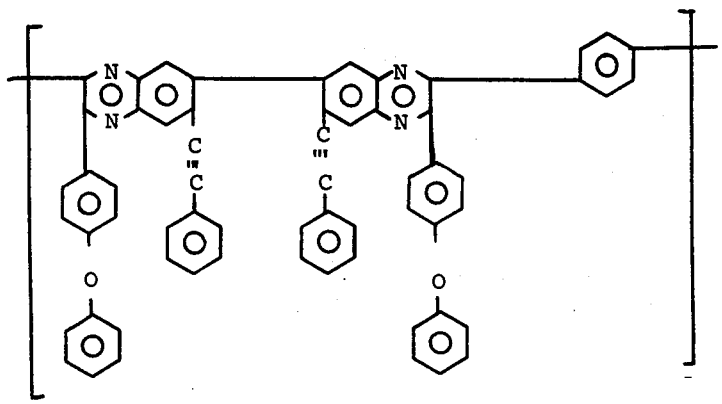

Poly[2,2'-(m-phenylene)-6,6'-bis(3-[p-phenyoxyphenyl]-7-phenylethynylquinoxaline)]

A solution of 2,2'-bis(phenylethynyl)-5,5'-diaminobenzidine (0.255 g, 0.000615 mol) in m-cresol (50 ml) was stirred at 23°C under dry nitrogen while adding m-bis(p'-phenoxyphenylglyoxylyl)benzene (0.324 g, 0.000615 mol). The reaction mixture was stirred for 96 hours at 23°C after which the polymer was precipitated by adding the reaction mixture to 1 liter of methanol. The precipitate was washed with methanol, reprecipitated twice with methanol from chloroform solution, and dried at 60°C and 1 mm of Hg pressure for 24 hours. The poly[2,2'-(m-phenylene)-5,5'-bis(3-[p-phenoxyphenyl]-7-phenylethynylquinoxaline)] showed an inherent viscosity of 0.13 dl/g in chloroform at 30°C.

Analysis — Calc'd for $C_{62}H_{36}N_4O_2$ (percent): C, 85.69; H, 4.18; N, 6.45. Found (percent): C, 85.12; H, 4.50; N, 5.83.

EXAMPLE VI

A sample of the polymer of Example V was subjected to differential thermal analysis ($\Delta T = 20°C/min$). According to the analysis, there was a strong exotherm at 246°C upon heating from 23° to 325°C. Upon cooling to room temperature and recycling to 400°C, no exotherm was observed.

Thermomechanical analysis ($\Delta T = 20°C/min$; expansion probe, 5 g load) showed a strong penetration indicative of a glass transition (softening point) at 215°C and a weak penetration at 378°C upon heating from 23° to 450°C. A sample of the polymer which had been heated under nitrogen to 320°C showed only a weak penetration at 370°C upon heating from 23° to 450°C in the thermomechanical analyzer.

An infrared spectrum of the polymer of Example V showed an intense acetylene band at 2210 cm$^{-1}$. The band diminished considerably in a spectrum of a polymer sample which had been heated to 250°C under nitrogen. The acetylene band disappeared almost completely in the spectrum of a polymer sample which had been heated to 300°C under nitrogen.

In the heating operations during which the polymer was cured, there was no evolution of volatile by-products.

As seen from the data in Example VI, the polymer of Example V underwent a glassy state transition at 215°C. Cyclization of the pendant phenylethynyl moieties to a dibenzoanthracene structure according to Formula IV, in which R is phenoxyphenyl and R' is phenylene, occurred at 246°C with concurrent solidification. The cured polymer subsequently showed a new softening point at about 370°C. The cured polymer of Example V had a structure according to Formula IV, in which R is p-phenoxyphenyl and R' is m-phenylene.

The data in Example IV show that the polymer of Example II in curing underwent an intramolecular cyclization of its pendant phenylethynyl groups at 260°C. This occurred in the solid state since since there was no prior softening of the polymer. The cured polymer had a structure according to Formula IV, in which R is phenyl and R' is phenyleneoxyphenylene.

Quinoxaline polymers of this invention are unique in that the polymers can be cured to a polymer which can be used at temperatures above their cure temperature. Thus, the polymer of Example V can be molded into a laminate at about 215°C. (The 215°C softening temperature would be decreased when molding under pressure.) The laminate is then cured at a temperature of about 246°C, and the resultant cured laminate is useable at temperatures up to 370°C. Quinoxaline polymers having the structure of the polymer of Example V are, therefore, the preferred polymers of this invention. Since the outstanding properties possessed by the polymer of Example V are believed to be attributable to its pendant phenoxyphenyl groups in combination with its pendant phenylethynyl groups, quinoxaline polymers are also preferred that have repeating units according to Formula I in which R is p-phenoxyphenyl.

As will be evident to those skilled in the art, modifications of the present invention can be made in view of the foregoing disclosure without departing from the spirit and scope of the invention.

We claim:
1. 2,2'-Bis(phenylethynyl)-5,5'-diaminobenzidine.

* * * * *